Oct. 6, 1942.     L. L. COLLINS     2,297,942
STEP VALVE FOR COMPRESSORS
Filed March 28, 1941     3 Sheets-Sheet 2
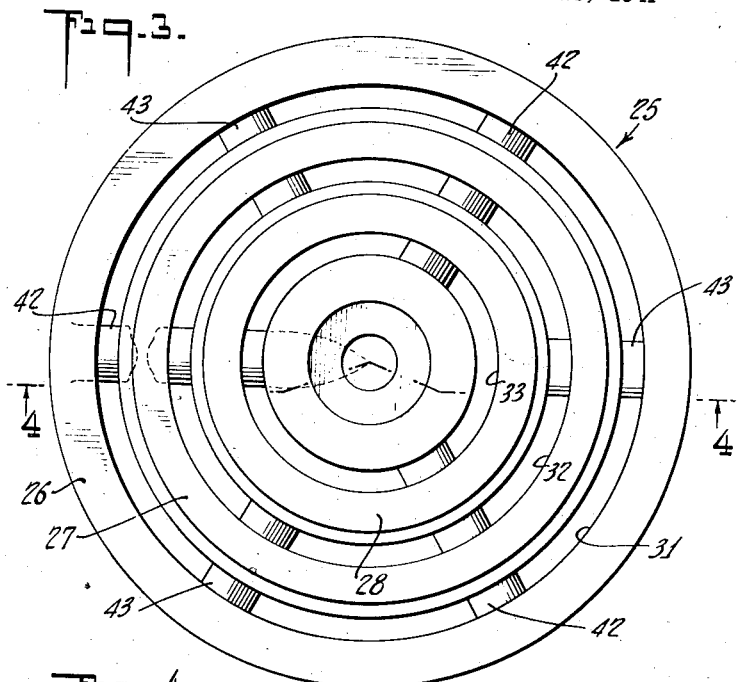
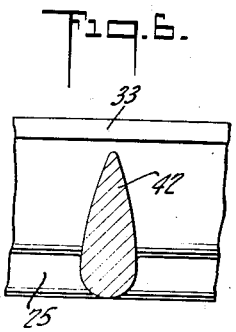
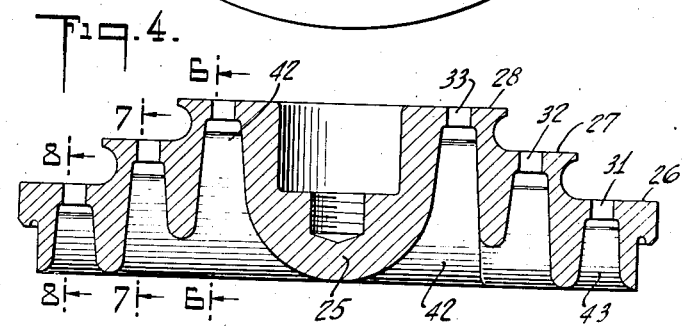
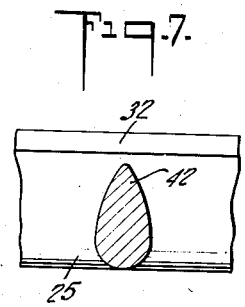
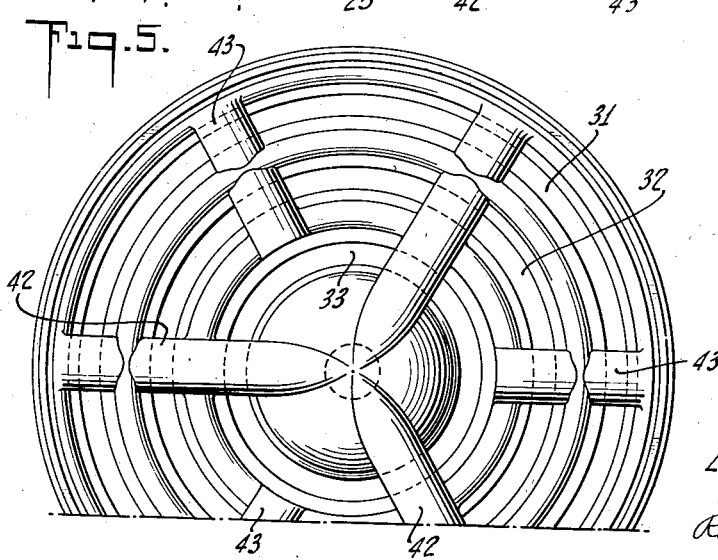
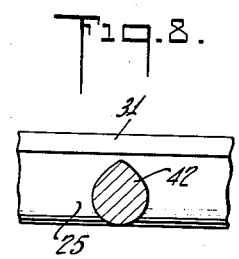
INVENTOR
LESTER L. COLLINS.
BY
Raymond G. Mullee
ATTORNEY

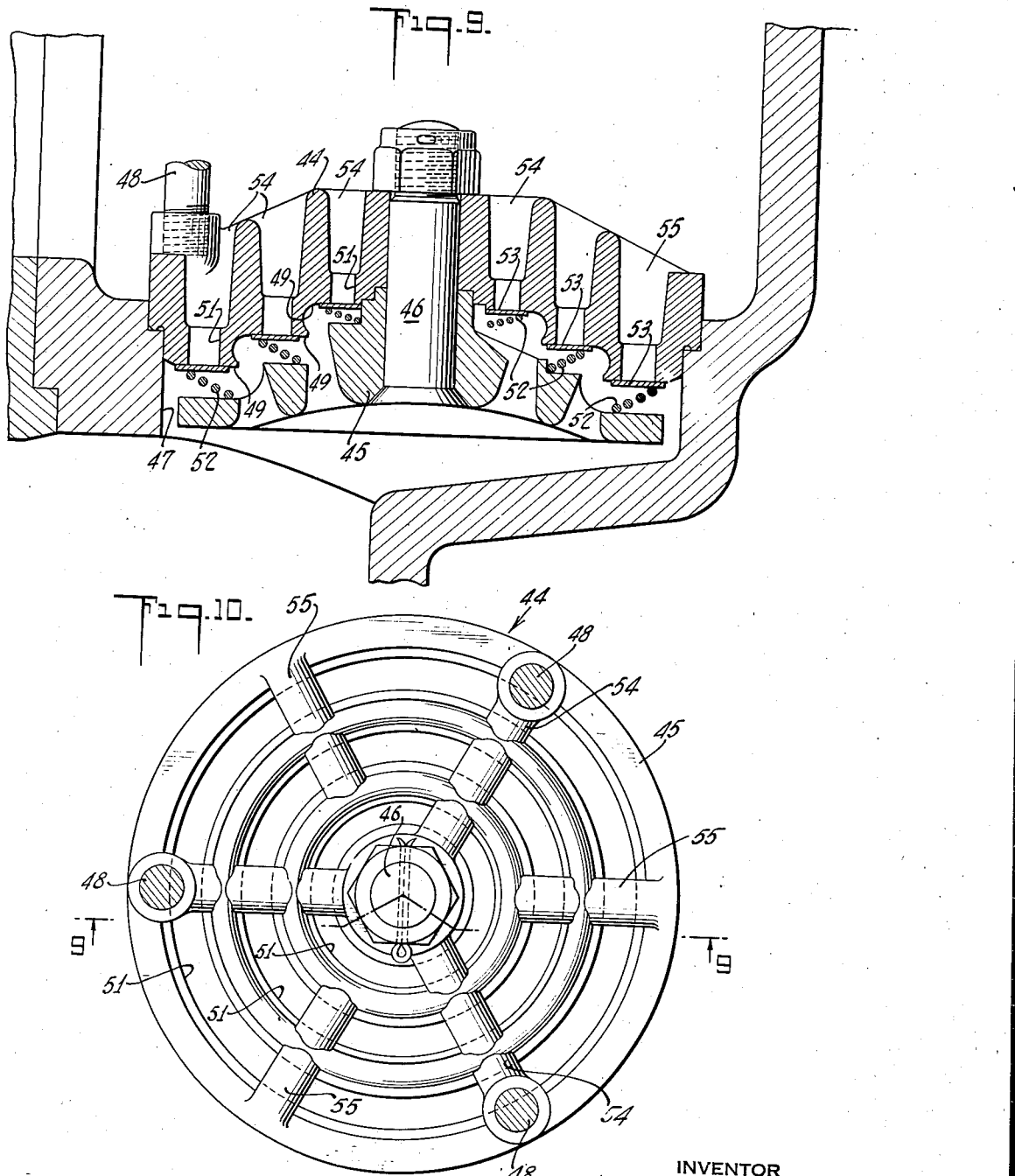

Patented Oct. 6, 1942

2,297,942

UNITED STATES PATENT OFFICE 2,297,942

STEP VALVE FOR COMPRESSORS

Lester L. Collins, Franklin, Pa., assignor to Chicago Pneumatic Tool Company, New York, N. Y., a corporation of New Jersey Application March 28, 1941, Serial No. 385,630

3 Claims. (Cl. 277—60)

This invention relates to valve assemblies in which a plurality of reciprocable plate type valves move to open and closed positions relatively to respective ported areas of a valve seat in response to pressure variations of a determined degree on opposite sides of the assembly.

Valve assemblies of this kind find a general use in air compressors where they are positioned in the wall of the compression chamber and control the flow of air to and from the chamber. Ordinarily, in multiple valve assemblies of this kind the several ported areas lie in the same level or plane. In order that the separate air streams emerging from the ported areas will not impinge one upon the other and thereby restrict the free flow of air through the assembly the ported areas must be spaced well apart. However, since it is desirable that a valve seat should have the greatest possible free area it has been customary to reduce the space between the ports to obtain additional ported or valve lift areas. The resulting conflict between adjacent air currents is particularly disadvantageous in the discharge of compressed air since it causes a drop in pressure of the discharged fluid.

It is contemplated by this invention to produce a generally new valve assembly in which the air streams passing through the assembly are relieved of the restriction caused by impingement upon each other. This is in part accomplished by constructing the valve seat with a stepped formation defining a series of shelves separated by riser walls. The ported areas are formed in the respective shelves and are thereby disposed at different levels or planes and the air issuing from the valve seat is directed in divergent streams through the assembly. By this means a less restricted valve opening is obtained and hence a much lower pressure differential is required to force a given quantity of air past the valves.

It is the general object of the invention to reduce the restriction imposed upon the flow of air through a valve assembly of the class described.

Another and attendant object is to permit the free ported area of a valve seat to be increased without increasing the degree of restriction imposed upon the flow of air and without increasing the diameter of the valve seat.

A further object of the invention is to increase the quantity of air a valve assembly of given diameter will pass with a given loss of pressure.

Other objects and structural details of the invention will be apparent from the following description when read in conjunction with the accompanying drawings, wherein:

Fig. 3 is a top plan view of the valve seat of the assembly shown in Fig. 2;

Fig. 4 is a view, in longitudinal section, taken substantially along the irregular line 4—4 of Fig. 3;

Fig. 5 is a bottom plan view of the valve seat of the assembly shown in Fig. 2;

Figure 2:
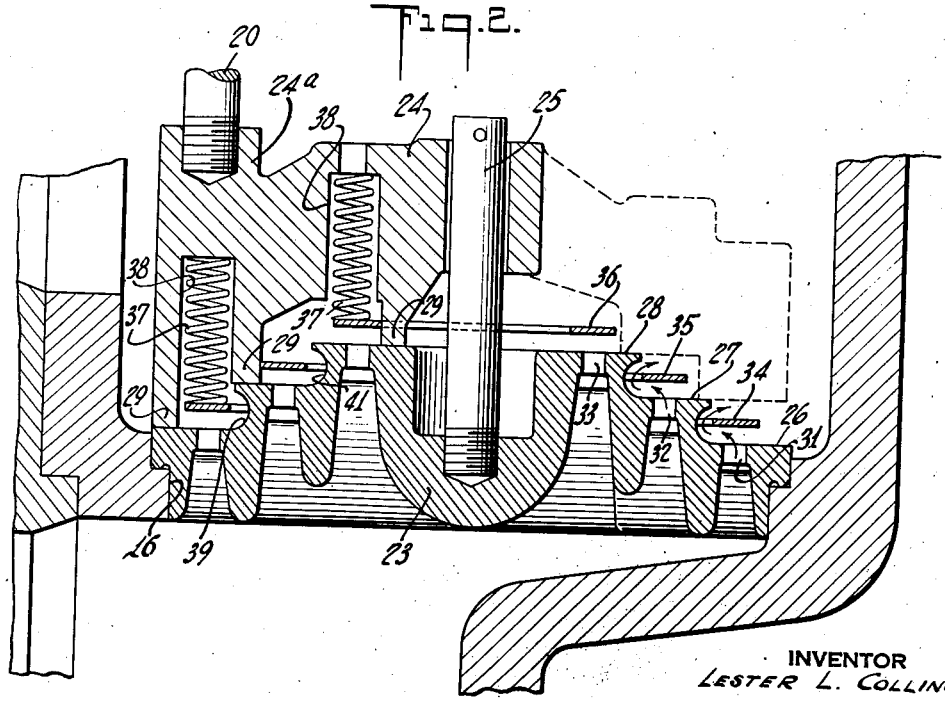
Fig. 2 is a view, in longitudinal section, of a discharge valve assembly and a fragmentary portion of the compressor cylinder, the plate valves of the assembly being shown in their lifted or open positions.

Figs. 6, 7 and 8 are fragmentary views, in cross section, taken substantially along the respective lines 6—6, 7—7 and 8—8 of Fig. 4;

Fig. 9 is a view similar to Fig. 2 showing an inlet valve assembly constructed in accordance with the present invention; and Fig. 10 is a top plan view of the valve assembly shown in Fig. 9.

Figure 1:
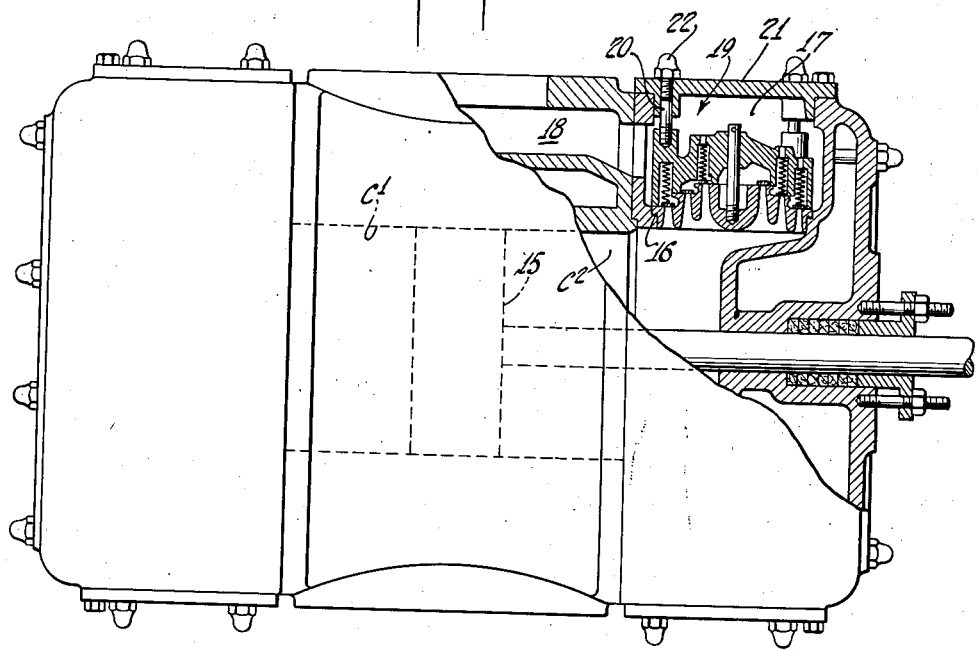
Fig. 1 is a view of a compressor cylinder embodying the valve mechanism of the invention, part of the cylinder being broken away to show a discharge valve assembly in longitudinal section.

The compressor cylinder of Fig. 1 is of the double acting type in which an independent compression chamber is formed on each side of a reciprocable piston 15. The flow of air to and from the compression chambers, indicated at C—1 and C—2, is controlled by respective sets of pressure responsive inlet and discharge valves located adjacent the opposite ends of the cylinder within the periphery thereof. A portion of the cylinder is broken away to show one of the control valves and the manner in which it is mounted within the cylinder. This valve, arranged to function as a discharge valve, is constructed in accordance with the invention and is positioned within an opening 16 connecting the compression chamber C—2 to a valve chamber 17 communicating with a discharge passage 18. Indicated generally at 19, the valve rests upon a ledge in the opening 16 and is further supported by three rods 20 projecting from a closure plate 21 and secured against outward movement by the usual set screws 22. The closure plate 21 is removable to permit easy access to the valve chamber 17.

Referring to Fig. 2, the valve 19 is comprised of an assembly of parts including a valve seat 23 and a valve keeper 24. The elements 23 and 24 are circular in form and are held with their adjacent faces in contact by a bolt 25 which is passed through the mid-portion of the keeper and secured within a central boss in the valve seat. The outer periphery of the valve seat 23 is cut way to form a shouldered portion engageable with the ledge projecting into the frame opening 16. From a maximum width equal to that of the opening 16, the valve seat rises in tiers of increasingly smaller diameter to form several annular steps or shelves 26, 27 and 28. The valve keeper 24 has a central hub portion through which the bolt 25 is passed, and a plurality of radial arms 24a each of which is adapted to receive a respective one of the supporting rods 20. The body of the keeper 24 is spaced slightly from the valve seat 23 by a series of fingers 29 which extend inward into contact with the stepped shelves 26, 27 and 28. The several shelves of the valve seat are formed with respective ported areas 31, 32 and 33 through which air may flow from the compression chamber C—2 to the valve chamber 17 and thence to discharge passage 18. Controlling the passage of air through the ported areas 31, 32 and 33 are associated plate valves 34, 35 and 36 in the form of rings. The valve rings are adapted to rest on their respective shelved portions of the valve seat and are movable axially to open and closed positions relatively to the ported areas within the shelves. The rings 34, 35 and 36 are guided in their movement by the fingers 29 of the keeper 24 and are pressed to closed position by coil springs 37 mounted in recesses 38 within the valve keeper and in the arms 24a thereof. When, during the compression stroke of the piston 15, the pressure within the chamber C—2 mounts to a height sufficient to overcome the springs 37, the valve rings 34, 35 and 36 are lifted to the open position of Fig. 2, and the compressed air thereby permitted to pass out the ported areas of the valve seat. As the piston 15 reaches the end of the compression stroke the air pressure within the chamber C—2 drops and the springs 37 are enabled to return the several valve rings to seated or closed position.

In the valve seat 23, the riser wall between the shelves 26 and 27 and the wall between the shelves 27 and 28 are formed with respective annular grooves 39 and 41 preferably of toroidal shape. These grooves serve as deflecting surfaces for the air discharged from the ported areas 31 and 32, and thereby reduce the resistance encountered by the air as it flows to the discharge passages. The grooves 39 and 41 further aid in preventing impingement of one air current upon another during the discharge period. The separation of the air currents is accomplished principally by placement of the ported areas at different levels within the valve seat. Air may pass freely through each ported area without conflict with the air issuing from the other ported areas and is directed through the assembly in an independent stream. By reason of this construction the clearance space between the ported areas may be reduced to less than the customary width and the ported area itself enlarged to increase the capacity of a valve assembly of given diameter.

Referring to Figs. 3, 4 and 5 it will be observed that the ported areas 31, 32 and 33 of the valve seat 23 are annular channels defined by internal continuations of the riser walls and intersected, inside the outer surface of the seat, by two sets of ribs 42 and 43. Referring particularly to Fig. 5, the ribs 42 are spaced at equidistant points around the circumference of the valve seat and extend inward from the inner periphery of the seat to the mid-point thereof. The ribs 43 are interspersed at equi-distant points between the ribs 42 and extend inward through the ported areas 31 and 32, but terminate short of the ported area 33. The sets of ribs 42 and 43 follow the stepped construction of the valve seat, and, accordingly, each rib varies in size from a minimum height in ported area 31 to a maximum height in ported area 33 or area 32. The changing size of one rib 42 may be seen in the cross sectional views Figs. 6, 7 and 8. These views further disclose that the ribs have a rounded or streamlined contour, tapering in the direction of the air flow in order that the air resistance of the ribs may be as small as possible.

As shown in Figs. 9 and 10 the invention is also capable of embodiment in an inlet valve assembly. The inlet assembly, while differing from the discharge valve assembly in the construction of its parts, maintains the structural principles of that assembly. Referring to Fig. 9, the inlet assembly comprises a valve seat 44 and a valve keeper 45, both of these elements being circular and held in assembled position by a bolt 46 serving the same purpose as the bolt 25 of the Fig. 2 assembly. The inlet assembly is shown positioned within a frame opening 47 communicating with a compression chamber of a compressor and is held in control position by a set of holding rods 48 (one shown) corresponding to the rods 20. The valve keeper 45 occupies the inner position within the assembly and is ported to permit the passage of air therethrough. The inner surface of the valve seat 44 is stepped to form shelved portions 49, each having an annular ported area 51 through which air is admitted to the compression chamber. The shelved portions 49 descend inward from the periphery of the valve seat thereby giving the inner surface of the seat a recessed or concave shape. The outer surface of the keeper 45 is stepped in complementary fashion to the adjacent surface of the valve seat and the ported areas of the keeper are slightly offset with respect to the ported areas 51. The imperforate shelved portions of the valve keeper opposite the ported areas 51 serve as bases for coil springs 52 which press associated valve rings 53 to closed position against the shelved portions 49. The discs 53 are similar in construction and operation to the discharge valve rings and lift automatically from seated position during the intake stroke of the compressor piston. As shown in Fig. 10 the inlet valve seat 44 is formed with sets of radially extending ribs 54 and 55 constructed and arranged in the same manner as the ribs 42 and 43 of the discharge valve assembly.

It will be evident that the invention may be embodied in valve assemblies other than the circular type herein disclosed. The principle of a stepped valve seat may, for example, be used with equally good effect in valve assemblies of the kind having ported areas controlled by longitudinal strip valves.

What is claimed is:

1. A valve assembly, comprising a valve seat having a stepped formation defining a series of shelves, a ported area formed in each of said shelves and extending longitudinally through the valve seat to permit the passage of fluid therethrough, and a plurality of radially extending ribs formed integrally with the valve seat and each extending at right angles to the longitudinal axis of said valve seat and intersecting said ported areas beneath the surface of said shelves, each of said ribs having a stepped construction conforming to the shape of the valve seat and a base of relatively wide diameter from which it tapers in the direction of air flow to a relatively narrow edge positioned immediately within the shelved portions.

2. A valve assembly, comprising a circular valve seat having a central boss, said valve seat rising from its outer periphery to the central boss thereof in tiers of increasingly smaller diameter to form a series of annular shelves separated by riser walls, an annular port in each of said shelves extending longitudinally through said seat, and integrally formed connection means within said valve seat comprising a series of radially spaced annular walls constituting internal continuations of said riser walls and paralleling the longitudinal axis of said central boss, and a series of ribs joining said annular walls and extending at right angles to the longitudinal axis of said central boss from the outer periphery of said seat to said boss, each of said ribs having a base of relatively wide diameter from which it tapers inward to a relatively narrow edge immediately within the shelved portions and having a stepped construction conforming to the shape of the valve seat.

3. A valve assembly, comprising a circular valve seat having a central boss, said valve seat rising from its outer periphery to the central boss thereof in tiers of increasingly smaller diameter to form a series of annular shelves separated by riser walls, an annular port in each of said shelves, a series of radially spaced annular walls within said valve seat formed as internal continuations of said riser walls and defining annular recesses into the bottoms of which said ports open, the adjacent surfaces of each pair of said walls diverging from a point of closest proximity at the bottom of a recess to a most distant point at the entrance of the recess, and a series of ribs joining said annular walls and extending at right angles to the longitudinal axis of said central boss from the outer periphery of said seat to said boss.

LESTER L. COLLINS.